(No Model.)

G. B. NORGRAVE.
SPROCKET WHEEL.

No. 366,600. Patented July 12, 1887.

WITNESSES:
Th. Rolle.
Jas. F. Kelly.

INVENTOR:
Geo. B. Norgrave
BY John A. Wiederoheim
ATTORNEY.

N. PETERS, Photo-Lithographer, Washington, D. C.

United States Patent Office.

GEORGE B. NORGRAVE, OF PHILADELPHIA, PENNSYLVANIA, ASSIGNOR OF ONE-HALF TO DANIEL GOFF AND JAMES L. SMITH, BOTH OF MILLVILLE, NEW JERSEY.

SPROCKET-WHEEL.

SPECIFICATION forming part of Letters Patent No. 366,600, dated July 12, 1887.

Application filed March 2, 1887. Serial No. 229,424. (No model.)

*To all whom it may concern:*

Be it known that I, GEORGE B. NORGRAVE, a citizen of the United States, residing in the city and county of Philadelphia, State of Pennsylvania, have invented a new and useful Improvement in Sprocket-Wheels, Pulleys, &c., which improvement is fully set forth in the following specification and accompanying drawings, in which—

Figure 1:
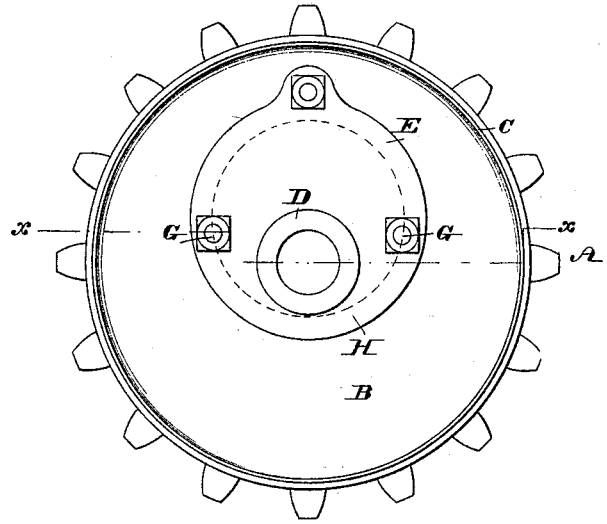
Figure 2:
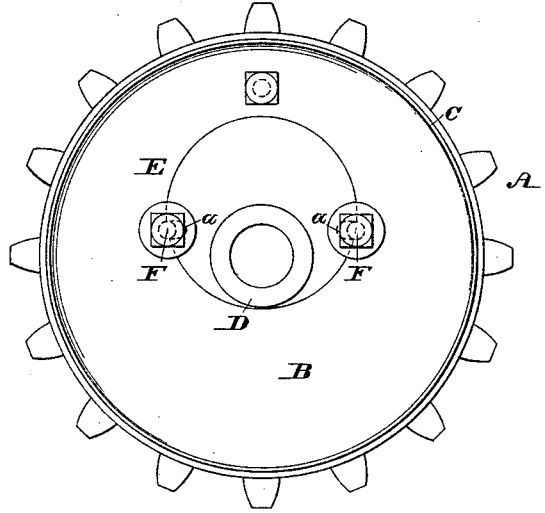
Figure 3:
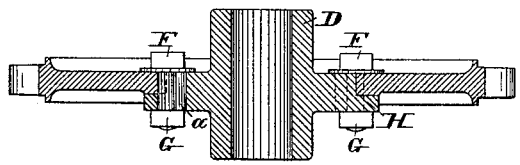

Figures 1 and 2 are views of opposite sides of a sprocket-wheel embodying my invention. Fig. 3 represents a section thereof in line $x$ $x$, Fig. 1.

Similar letters of reference indicate corresponding parts in the several figures.

My invention consists of a sprocket-wheel, pulley, roller, &c., having a hub which is eccentrically connected with a movable disk or section, the latter constituting part of the body of said wheel, &c., whereby the wheel, &c., may be converted from concentric to eccentric, a feature specially serviceable for loosening the chain or belt which engages with said wheel, &c.

Referring to the drawings, A represents a sprocket-wheel consisting of the body B with an eccentric opening, the toothed rim C, the hub D, and the disk or section E, which latter constitutes part of said body and has the hub cast with or otherwise secured to it, said disk being slotted at its periphery for the passage of bolts F, which, by means of nuts G, clamp the disk firmly to the body, it being seen that the hub occupies an eccentric position on the disk, but is concentric with the rim of the wheel.

By loosening the nuts G the disk may be rotated, whereby the hub is eccentric to the rim of the wheel, so that a chain may be readily applied to said rim, or a chain previously thereon may be slackened or loosened, when so required. By returning the disk to its normal position and tightening the nuts of the bolts the hub is again concentric and the chain or belt tightened.

In order to prevent slipping of the bolts, the wall of the eccentric opening in the body of the wheel in which the disk is fitted is slotted at places coincident with the slots in the periphery of the disk, as at $a$ $a$, whereby the bolts which occupy portions of said slots of the body and the corresponding slots of the disk are thus in contact with the walls of the two-part slots $a$ $a$. The slots are also lengthened, so that when the bolts are loosened they may be shifted to the end of the slots, and thus permit the rotation of the disk without necessarily removing said bolts.

The periphery of the disk is formed with a flange or shoulder, H, which overlaps the wall of the opening in the body B, as most plainly shown in Fig. 3, whereby said periphery is reenforced and the body of the wheel accordingly strengthened at the point between the body and disk.

I am aware that it is not new to construct a journal or hub bearing with an adjustable eccentric, and such I do not claim; but I am not aware that the peculiar construction and arrangement of parts as herein set forth and claimed, whereby an adjustable plate or disk with hub may be securely fastened in position as described, is old.

Having thus described my invention, what I claim as new, and desire to secure by Letters Patent, is—

1. A wheel having a body, B, with an eccentric opening, the walls of the latter having recesses, the disk E, with a hub, and having slots in its periphery corresponding to the recesses in the body, and fastening-bolts, substantially as described.

2. The body B, with an eccentric opening the walls of which are recessed, substantially as described, in combination with a disk having a hub, peripheral slots, and a flange, H, and fastening-bolts, substantially as and for the purpose set forth.

GEORGE B. NORGRAVE.

Witnesses:
JOHN A. WIEDERSHEIM,
JAS. F. KELLY.